United States Patent
Kato

(10) Patent No.: US 11,100,859 B2
(45) Date of Patent: Aug. 24, 2021

(54) PROCESSING CIRCUIT, DISPLAY DEVICE, AND PROCESSING METHOD FOR REDUCING CURRENT DURING LUMINANCE CHANGE

(71) Applicant: JOLED INC., Tokyo (JP)

(72) Inventor: Toshiyuki Kato, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 16/774,743

(22) Filed: Jan. 28, 2020

(65) Prior Publication Data

US 2020/0279528 A1    Sep. 3, 2020

(30) Foreign Application Priority Data

Jan. 29, 2019   (JP) .............................. JP2019-013493

(51) Int. Cl.
  *G09G 3/3233*   (2016.01)
  *G09G 3/3291*   (2016.01)
  *H04N 5/369*    (2011.01)

(52) U.S. Cl.
  CPC ......... *G09G 3/3233* (2013.01); *G09G 3/3291* (2013.01); *H04N 5/36965* (2018.08); *G09G 2300/0842* (2013.01); *G09G 2320/0233* (2013.01); *G09G 2320/0295* (2013.01); *G09G 2320/043* (2013.01)

(58) Field of Classification Search
  CPC .. G09G 3/3233; G09G 3/3291; G09G 3/3225; G09G 3/2085; G09G 5/008; G09G 2330/021; G09G 5/395; G09G 2320/0633; G09G 2320/0233; G09G 2320/0295; G09G 2320/043; G09G 2300/0842; G09G 2360/16; G09G 2370/08; G09G 2360/08; G09G 2320/0271; G09G 2360/18; G09G 2310/0213; H04N 5/36965
  See application file for complete search history.

(56) References Cited

U.S. PATENT DOCUMENTS

| 2012/0069062 A1* | 3/2012 | Ishihara | G09G 3/3611 345/690 |
| 2014/0198091 A1* | 7/2014 | Shin | G09G 3/3266 345/212 |

FOREIGN PATENT DOCUMENTS

JP    2007-212644    8/2007

* cited by examiner

*Primary Examiner* — Yaron Cohen
(74) *Attorney, Agent, or Firm* — Greenblum & Bernstein, P.L.C.

(57) ABSTRACT

A processing circuit processes video signals for a display device which includes a display panel including pixels each having a self light emitting element and a current limiting circuit limiting a current to the pixels. The processing circuit includes: a frame memory storing video signals of a previous frame; and a signal processer which: compares a luminance represented by a video signal of the current frame corresponding to a pixel and a luminance represented by a video signal of the previous frame corresponding to the pixel; outputs the video signal of the current frame in a case where the luminance represented by the video signal of the current frame is equal to or smaller than the luminance represented by the video signal of the previous frame or equal to or smaller than a predetermined threshold value; and outputs a weighted average of the video signal of the current frame and the video signal of the previous frame in any other case.

9 Claims, 15 Drawing Sheets

PROCESSING CIRCUIT, DISPLAY DEVICE, AND PROCESSING METHOD FOR REDUCING CURRENT DURING LUMINANCE CHANGE

CROSS REFERENCE TO RELATED APPLICATION

The present application is based on and claims priority of Japanese Patent Application No. 2019-013493 filed on Jan. 29, 2019. The entire disclosure of the above-identified application, including the specification, drawings and claims is incorporated herein by reference in its entirety.

FIELD

The present disclosure relates to a processing circuit, a display device, and a processing method.

BACKGROUND

Conventionally, display devices each including pixels each having a self light emitting element have been developed. The display devices include organic electro-luminescent (EL) display devices. In such a display device, increase in the size of a display panel has been desired. The increase in the size of the display panel is accompanied by increase in electric power to be consumed in the display device. In view of this, a technique for reducing electric power consumption in a display device has been known (see Patent Literature 1). In the display device disclosed in Patent Literature 1, the electric power consumption in the display panel is reduced by calculating electric power consumption in the display panel for each horizontal period (horizontal synchronization period) based on a video signal, and limiting a current to be supplied to each of pixels of the display panel, based on the result of the calculation. In this way, the display device disclosed in Patent Literature 1 tries to reduce the electric power consumption in the display panel to a control target electric power value or below.

CITATION LIST

Patent Literature

[Patent Literature 1] Japanese Unexamined Patent Application Publication No. 2007-212644

SUMMARY

Technical Problem

However, in the display device disclosed in Patent Literature 1, when a luminance represented by a video signal abruptly increases as, for example, in the case of switching from all black display to all white display, the electric power consumption of the display panel may exceed the control target electric power value.

The present disclosure has been made considering the above problem, and has an object to provide a processing circuit, etc., capable of reducing a current to be supplied to the display panel even when the luminance represented by a video signal abruptly increases.

Solution to Problem

In order to achieve the above object, a processing circuit according to an aspect of the present disclosure is a processing circuit which processes video signals for a display device which includes a display panel and a current limiting circuit. The display panel includes a plurality of pixels each having a self light emitting element, and the current limiting circuit limits a current to be supplied to the plurality of pixels. The processing circuit includes a frame memory which stores video signals of a previous frame which is a frame before a current frame to be input to the processing circuit. The video signals correspond to the plurality of pixels. The processing circuit also includes a signal processer which: compares a luminance represented by a video signal which is included in video signals of the current frame and which corresponds to a pixel included in the plurality of pixels and a luminance represented by a video signal which is included in the video signals of the previous frame and which corresponds to the pixel; outputs the video signal of the current frame as it is in a case where the luminance represented by the video signal of the current frame is equal to or smaller than the luminance represented by the video signal of the previous frame or equal to or smaller than a predetermined threshold value; and outputs a weighted average of the video signal of the current frame and the video signal of the previous frame in any other case.

In addition, in order to achieve the above object, a display device according to an aspect of the present disclosure includes the processing circuit, the display panel, and the current limiting circuit.

In addition, in order to achieve the above object, a processing method according to an aspect of the present disclosure is a processing method for processing video signals for a display device which includes a display panel and a current limiting circuit. The display panel includes a plurality of pixels each having a self light emitting element, and the current limiting circuit limiting a current to be supplied to the plurality of pixels. The processing method includes a step of storing video signals of a previous frame which is a frame before a current frame, the video signals corresponding to the plurality of pixels. The processing method also includes a step including: comparing a luminance represented by a video signal which is included in video signals of the current frame and which corresponds to a pixel included in the plurality of pixels and a luminance represented by a video signal which is included in the video signals of the previous frame and which corresponds to the pixel; outputting the video signal of the current frame as it is in a case where the luminance represented by the video signal of the current frame is equal to or smaller than the luminance represented by the video signal of the previous frame or equal to or smaller than a predetermined threshold value; and outputting a weighted average of the video signal of the current frame and the video signal of the previous frame in any other case.

Advantageous Effects

With the present disclosure, it is possible to provide the processing circuit etc., capable of reducing a current to be supplied to the display panel even when the luminance represented by the video signal abruptly increases.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Hereinafter, an embodiment of the present disclosure is described with reference to the drawings. It is to be noted that each of embodiments described below indicates a specific example in the present disclosure. Accordingly, the numerical values, shapes, materials, constituent elements, the arrangement and connection of the constituent elements, steps, the processing order of the steps etc. indicated in the following embodiments are mere examples, and therefore do not limit the scope of the present disclosure. Therefore, among the constituent elements in the following embodiments, constituent elements not recited in any one of the independent claims that define the most generic concept are described as optional constituent elements.

It is to be noted that each of the drawings is a schematic diagram, and is not necessarily illustrated precisely. In addition, in each of the drawings, substantially the same constituent elements are assigned with the same numerical signs, and overlapping descriptions are omitted or simplified.

Embodiment

1. The Whole Configuration of a Display Device

First, the whole configuration of the display device according to an embodiment is described with reference to FIGS. 1 to 4.

Figure 1:
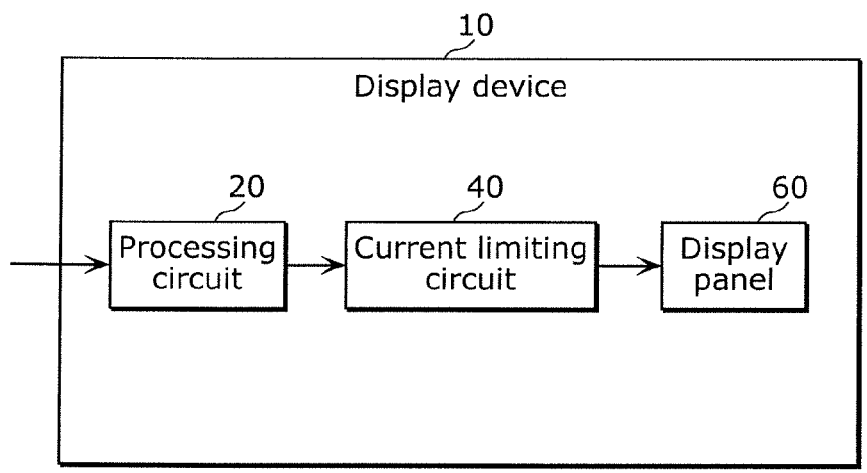
FIG. 1 is a functional block diagram illustrating a functional configuration of a display device according to an embodiment.
Figure 2:
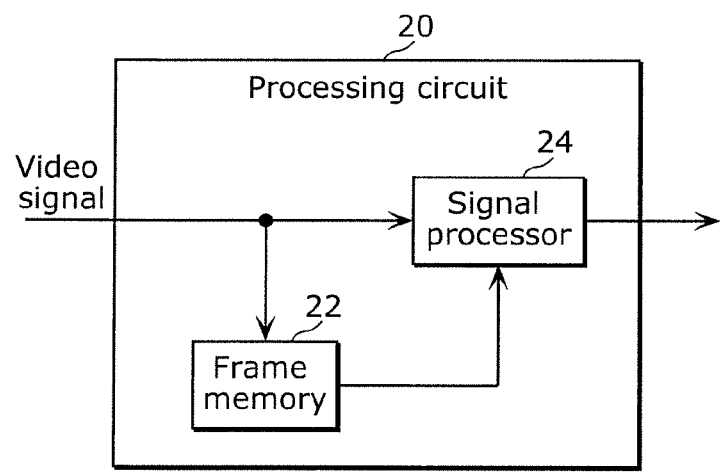
FIG. 2 is a block diagram illustrating a functional configuration of a processing circuit according to the embodiment.
Figure 3:
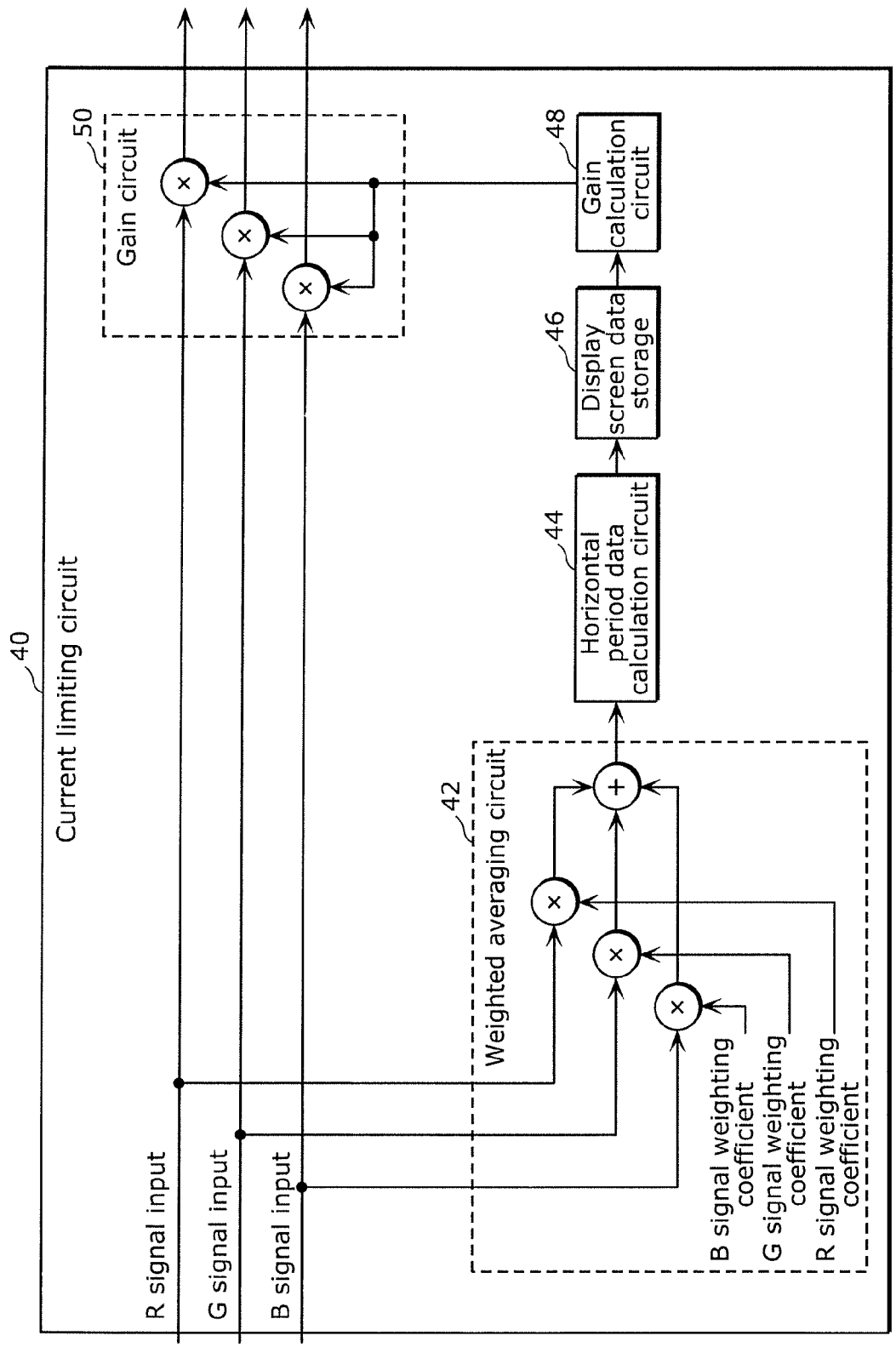
FIG. 3 is a block diagram illustrating a functional configuration of a current limiting circuit included in the display device according to the embodiment.
Figure 4:
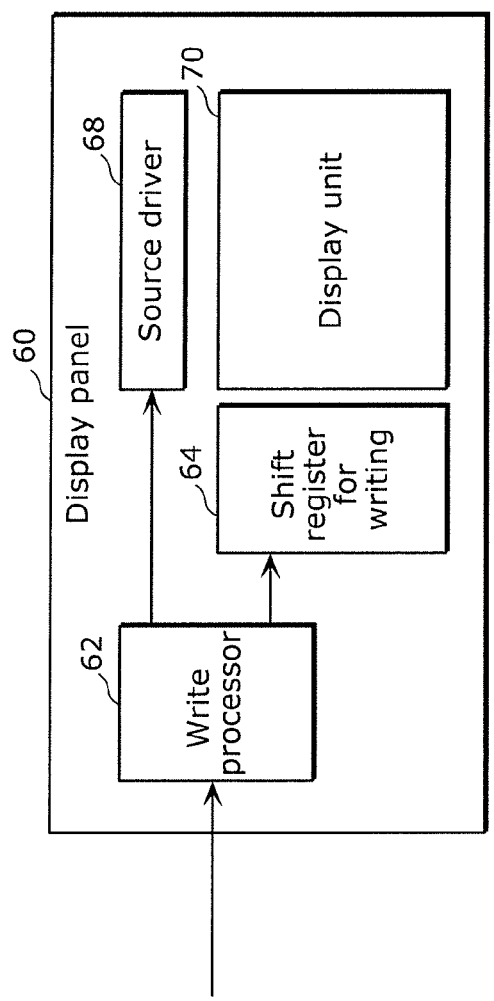
FIG. 4 is a block diagram illustrating a functional configuration of a display panel included in the display device according to the embodiment.

FIG. 1 is a functional block diagram illustrating a functional configuration of display device 10 according to the embodiment. FIG. 2 is a block diagram illustrating a functional configuration of processing circuit 20 according to the embodiment. FIG. 3 is a block diagram illustrating a functional configuration of current limiting circuit 40 included in display device 10 according to the embodiment. FIG. 4 is a block diagram illustrating a functional configuration of display panel 60 included in display device 10 according to the embodiment.

As illustrated in FIG. 1, display device 10 includes processing circuit 20, current limiting circuit 40, and display panel 60.

Processing circuit 20 is a circuit which processes video signals for display device 10. As illustrated in FIG. 2, processing circuit 20 includes frame memory 22 and signal processor 24.

Frame memory 22 is a storage which stores video signals of a previous frame which is the frame before a current frame to be input to processing circuit 20. The video signals correspond to a plurality of pixels. Frame memory 22 is implemented by, for example, a random access memory (RAM).

Signal processor 24 is a processor which limits the amount of current to be supplied to the plurality of pixels included in display panel 60 by processing video signals to be input to display device 10. Processing in signal processor 24 and the effects thereof are described later.

Display panel 60 is a panel which includes the plurality of pixels each having a self light emitting element, and which displays an image corresponding to video signals. As illustrated in FIG. 4, display panel 60 includes display unit 70, write processor 62, source driver 68, and shift register for writing 64. Display unit 70 includes the plurality of pixels, and displays the image corresponding to the video signals. Write processor 62 outputs a control signal and a data signal for writing display data to display unit 70. Source driver 68 outputs the data signal to display unit 70. Shift register for writing 64 outputs, to display unit 70, a write signal which is a control signal for writing the data signal to display unit 70.

Current limiting circuit 40 is a circuit which limits a current to be supplied to the plurality of pixels included in display panel 60. In this embodiment, current limiting circuit 40 limits a current to be supplied to the plurality of pixels when the value of the electric power to be supplied to the plurality of pixels corresponding to the electric power consumption of display panel 60 exceeds a control target electric power value. As illustrated in FIG. 3, current limiting circuit 40 includes, weighted averaging circuit 42, horizontal period data calculation circuit 44, display screen data storage 46, gain calculation circuit 48, and gain circuit 50.

Weighted averaging circuit 42 is a circuit which calculates a weighted average of pixel values of respective R, G, and B signals. As illustrated in FIG. 3, weighted averaging circuit 42 multiplies display data of R, G, and B pixels by weighting coefficients according to electric power consumption characteristics of the respective R, G, and B pixels of display unit 70, and calculates the sum of these multiplication results.

Horizontal period data calculation circuit 44 calculates horizontal period electric power conversion data corresponding to display data for each of horizontal periods. In this embodiment, horizontal period data calculation circuit 44 calculates an integrated value or an average value of weighted averages in the horizontal period output by weighted averaging circuit 42 as the horizontal period electric power conversion data (a level integration value).

Display screen data storage 46 stores electric power conversion data corresponding to one frame. In this embodiment, display screen data storage 46 stores electric power conversion data corresponding to one frame output by horizontal period data calculation circuit 44.

Gain calculation circuit 48 calculates a gain by which the video signal is to be multiplied, based on electric power conversion data stored in display screen data storage 46 and a control target electric power value. In this embodiment, gain calculation circuit 48 calculates a display screen electric power which is the electric power consumption of the plurality of pixels for one frame, based on the electric power conversion data stored in display screen data storage 46. Gain calculation circuit 48 further calculates, as a gain, the ratio of the control target electric power value relative to the display screen electric power, when the display screen electric power exceeds the control target electric power value. In this case, a gain is less than 1. Gain calculation circuit 48 calculates 1 as the gain when the display screen electric power does not exceed the control target electric power value.

Gain circuit 50 is a circuit which multiplies a video signal by a gain. Gain circuit 50 multiplies the video signal by the gain calculated in gain calculation circuit 48. In this embodiment, as illustrated in FIG. 3, each of the R, G, and B signals is multiplied by the gain. In this way, the video signal is multiplied by the gain less than 1 when the display screen electric power exceeds the control target electric power value, the luminance of the video signal can be reduced. Accordingly, a current to be supplied to the plurality of pixels of display panel 60 is limited.

Figure 5:
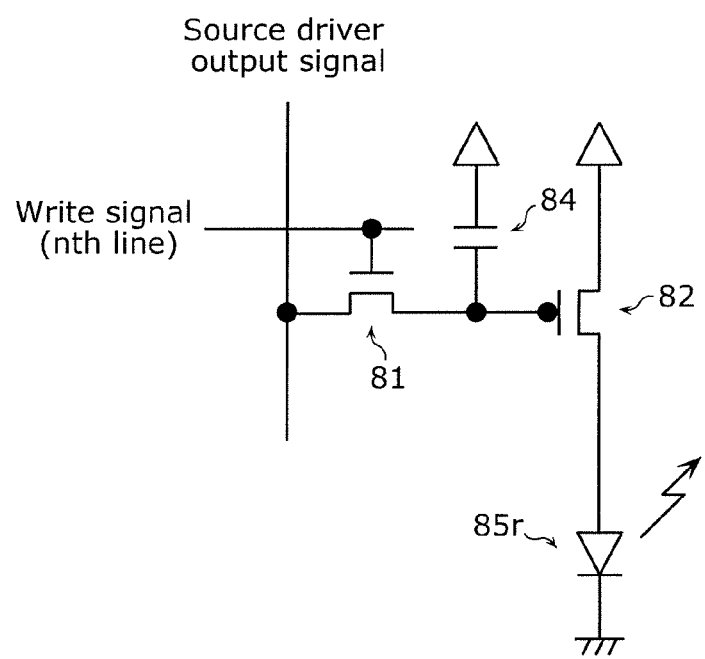
FIG. 5 is a circuit diagram illustrating one example of a configuration of a sub-pixel in a pixel according to the embodiment.

The plurality of pixels included in display panel 60 is described with reference to FIG. 5. FIG. 5 is a circuit diagram illustrating one example of the configuration of a sub-pixel in a pixel according to this embodiment. FIG. 5 illustrates the sub-pixel including an organic EL element as a self light emitting element. The pixel according to this embodiment includes three sub-pixels corresponding respectively to three colours of R, G, and B. The sub-pixel illustrated in FIG. 5 is a sub-pixel for emitting red (R) light. It is to be noted that a sub-pixel for emitting green light and a sub-pixel for emitting blue light have the same circuit configuration as that of the circuit illustrated in FIG. 5.

As illustrated in FIG. 5, the sub-pixel includes thin film transistor (TFT) 81, capacitor 84, TFT 82, and self light emitting element 85r.

TFT 81 has an end to which a data signal which is an output signal of source driver 68 is input. Capacitor 84 is connected to TFT 81. TFT 82 has a control terminal connected to a connection point between TFT 81 and capacitor 84. Self light emitting element 85r is connected to TFT 82.

TFT 81 switches between on and off based on a write signal which is a control signal that is output by shift register for writing 64. When TFT 81 is switched on by a write signal in one horizontal period, a data signal which is a source driver output signal according to the signal level to be written onto a pixel is held in capacitor 84.

After the write signal is switched off, the current according to a voltage held in capacitor 84 flows to TFT 82, and self light emitting element 85r turns on.

2. Operations Performed by the Current Limiting Circuit

Next, operations performed by current limiting circuit 40 are described.

Figure 6:
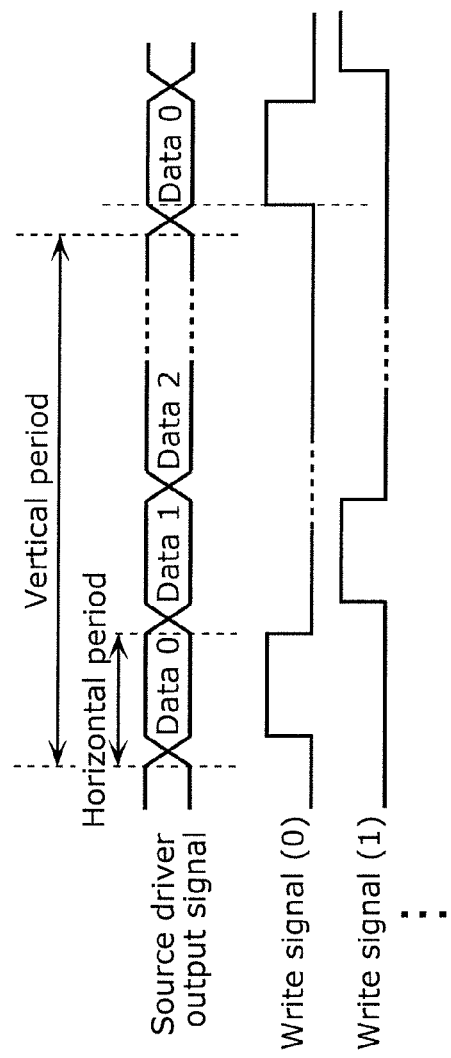
FIG. 6 is a diagram illustrating examples of write signals to be input to the sub-pixel according to the embodiment.

First, a signal to be input to the sub-pixel illustrated in FIG. 5 is described with reference to FIG. 6. FIG. 6 is a diagram illustrating one example of a write signal to be input to the sub-pixel according to this embodiment. Display device 10 writes data signal output by source driver 68 to display unit 70 by means of a write signal, and emits light on the basis of the pixels in one horizontal line (hereinafter, also simply referred to as a "line").

Figure 7:
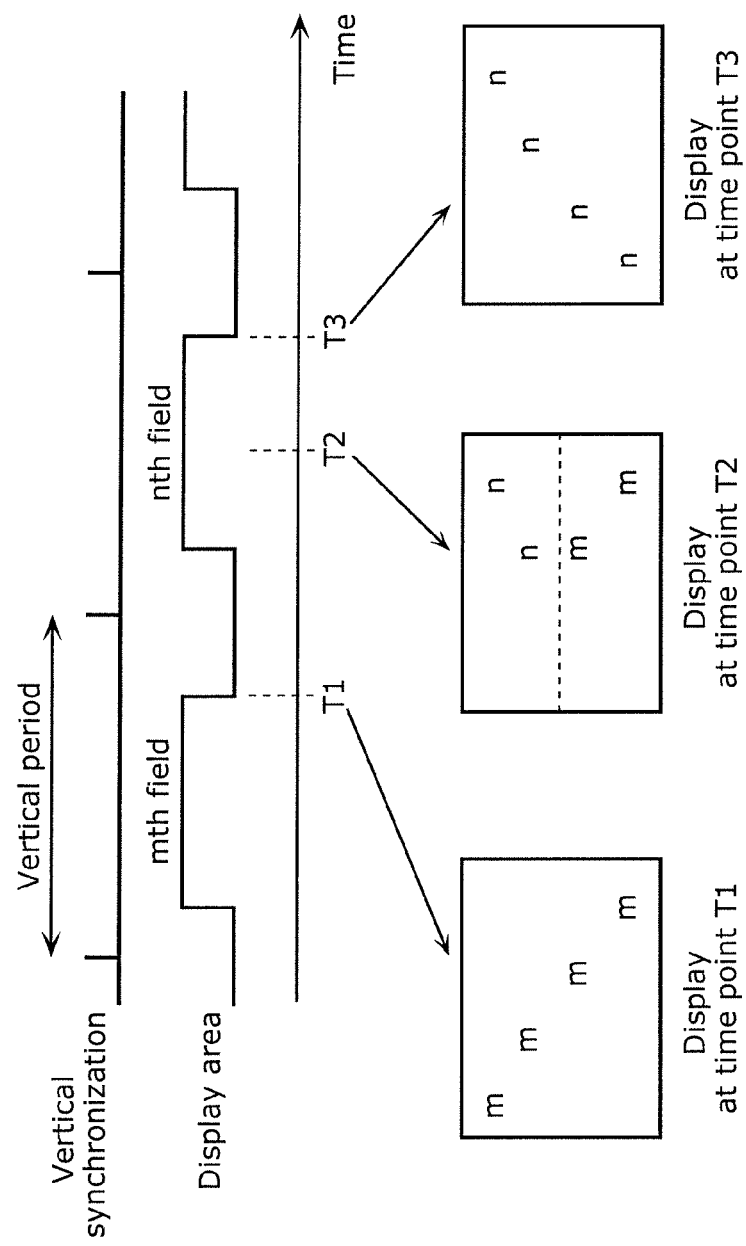
FIG. 7 is a schematic diagram illustrating display state transitions of the display unit according to the embodiment.

Next, display state transitions of display unit 70 are described with reference to FIG. 7. FIG. 7 is a schematic diagram illustrating display state transitions of display unit 70 according to this embodiment. In FIG. 7, display on the display screen transits from time point T1 to time point T2, and from time point T2 to time point T3. The mth field display screen is displayed at time point T1 corresponding to the end of the mth field illustrated in FIG. 7. Here, shift register for writing 64 which outputs a write signal which is a control signal for writing data signal to each pixel outputs a write signal so that scanning is performed from top to bottom of the display screen starting at the beginning part of the display area of display unit 70. For this reason, at time point T2 corresponding to the middle of the nth field (that is, the (m+1)th period) next to the mth field, the top half of the display screen is an nth field display screen, and the bottom half remains unchanged from the mth field. When time point T3 corresponding to the end of the nth field is reached, scanning to the bottom of the display area is completed and the entirety of the display screen is changed to the nth field.

Figure 8:
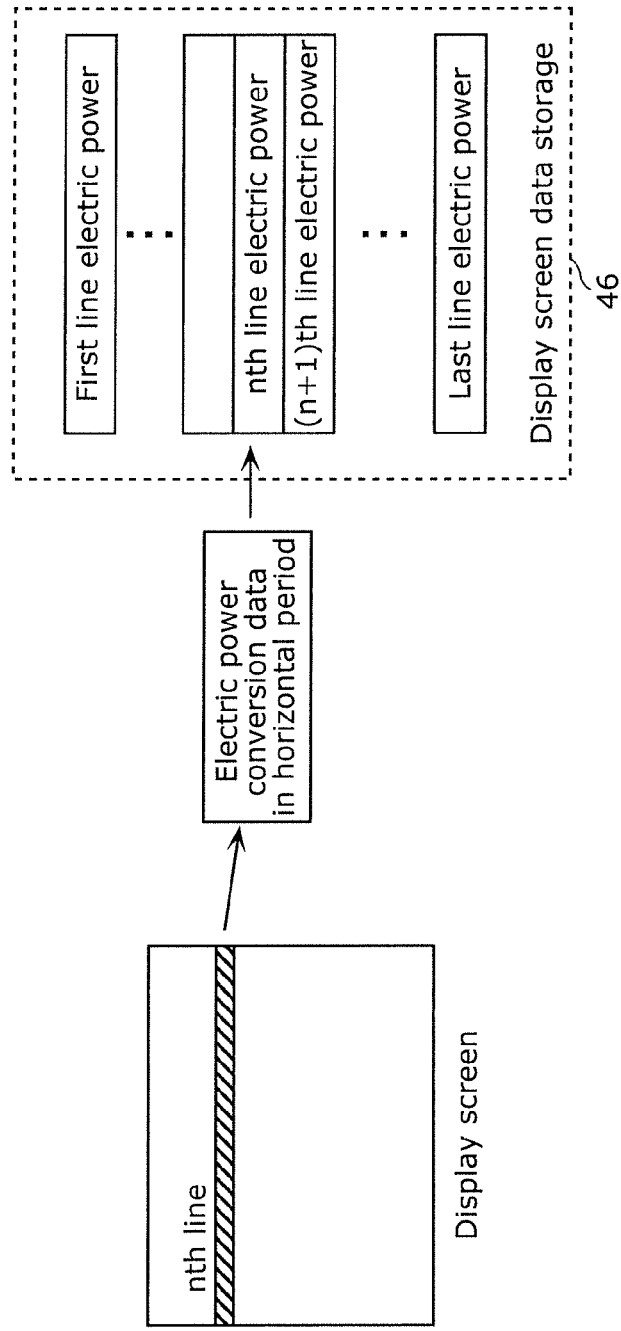
FIG. 8 is a schematic diagram illustrating the configuration of display screen data storage according to the embodiment.

Next, a configuration of display screen data storage 46 is described with reference to FIG. 8. FIG. 8 is a schematic diagram illustrating a configuration of display screen data storage 46 according to this embodiment. As illustrated in FIG. 8, display screen data storage 46 stores horizontal period electric power conversion data for each horizontal line on the display screen of display unit 70 as signal information to be written to display unit 70. For example, the horizontal period electric power conversion data in the ith line is stored in display screen data storage 46 as the ith line electric power value. When re-writing of the next field is started, display screen data storage 46 newly re-writes the electric power value to be stored and stores it as the electric power value corresponding to the signal written onto the display screen.

Figure 9:
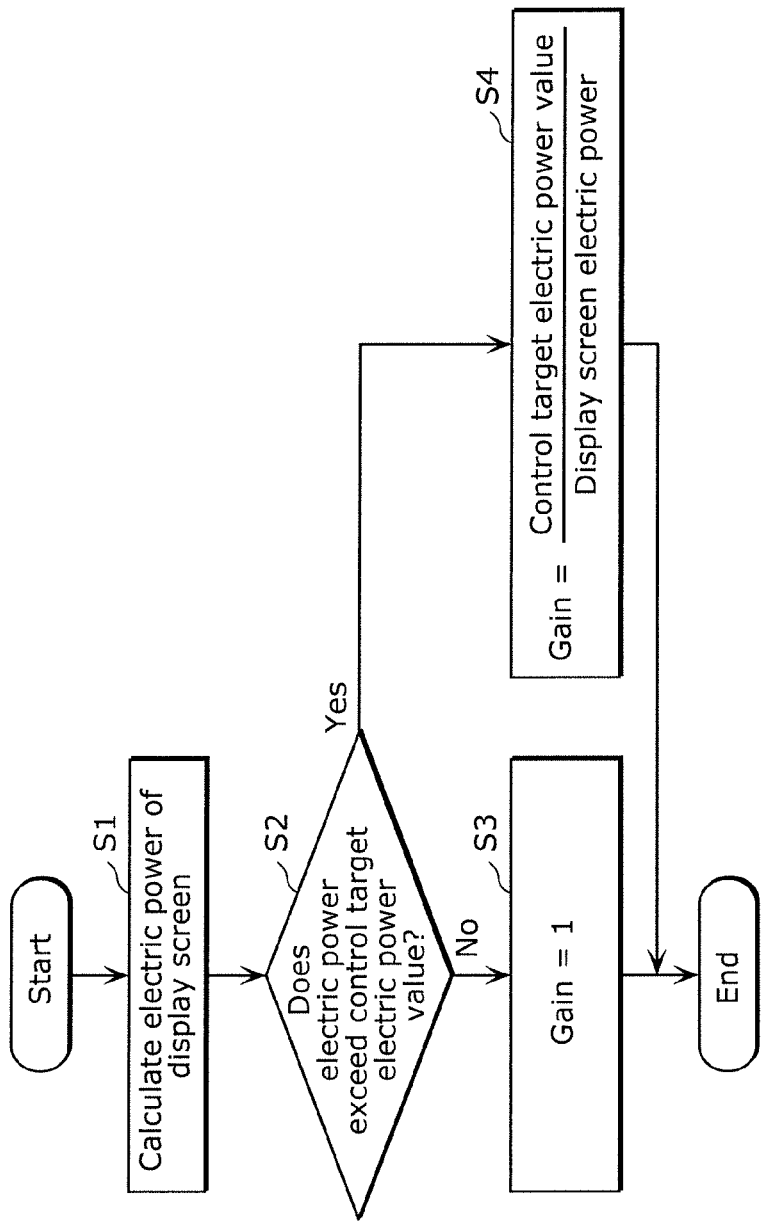
FIG. 9 is a flow chart indicating a gain calculating method in a gain calculation circuit according to the embodiment.

Next, a calculation process in gain calculation circuit 48 is described with reference to FIG. 9. FIG. 9 is a flow chart indicating a gain calculation method in gain calculation circuit 48 according to this embodiment.

As illustrated in FIG. 9, first, gain calculation circuit 48 calculates electric power of a display screen based on the horizontal period electric power conversion data stored in display screen data storage 46 (S1). Hereinafter, specifically, the sum of horizontal period electric power conversion data of the respective horizontal lines stored in display screen data storage 46 is calculated as the electric power of the display screen.

Gain calculation circuit 48 then determines whether the calculated display screen electric power exceeds the predetermined control target electric power value (S2). When the display screen electric power does not exceed the control target electric power value, a gain is set to 1 (S3). When the display screen electric power exceeds the control target electric power value, the ratio of the control target electric power value relative to the display screen electric power is calculated as a gain less than 1 (S4).

As described above, the gain calculated by gain calculation circuit 48 is input to gain circuit 50. By means of gain circuit 50 integrating the gain in the video signal, a current to be supplied to the plurality of pixels of display panel 60 is limited when the electric power of the display screen exceeds the control target value.

3. Processing Method

Figure 10:
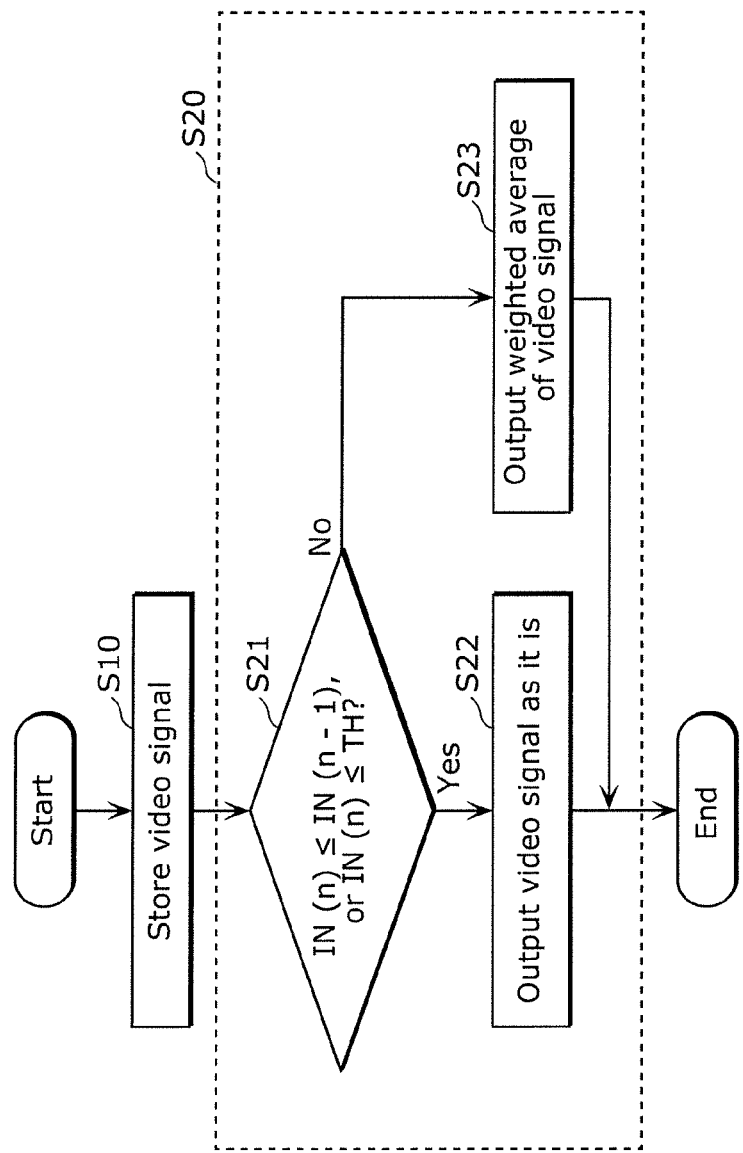
FIG. 10 is a flow chart indicating a processing method in a processing circuit according to the embodiment.

Next, a processing method in processing circuit 20 according to this embodiment is described with reference to FIG. 10. FIG. 10 is a flow chart indicating the processing method in processing circuit 20 according to this embodiment.

As illustrated in FIG. 10, first, video signals of a previous frame which is the frame before a current frame to be input to processing circuit 20 are stored in frame memory 22 of processing circuit 20 (S10). The video signals correspond to a plurality of pixels.

A current video signal is processed by signal processor 24 of processing circuit 20 (S20). In Step S20 in which the video signal is processed, first, luminance IN (n) represented by a video signal which is included in video signals of the current frame and which corresponds to a pixel included in the plurality of pixels is compared with luminance IN (n−1) represented by a video signal which is included in the video signals of the previous frame and which corresponds to the pixel (S21). In the case where luminance IN (n) represented by the video signal of the current frame is equal to or smaller than luminance IN (n−1) represented by the video signal of the previous frame or equal to or smaller than predetermined threshold value TH (Yes in S21), the video signal of the current frame corresponding to the pixel is output as it is (S22). In the other cases including the case where luminance IN (n) represented by the video signal of the current frame is larger than luminance (n−1) represented by the video signal of the previous frame and larger than predetermined threshold value TH (No in S21), a weighted average of the video signal of the current frame and the video signal of the previous frame both corresponding to the pixel is output (S23).

As described above, when signal processor 24 according to this embodiment outputs the video signal of the current frame to display panel 60 as it is when luminance IN (n) (n is a natural number) represented by the video signal of the current frame is smaller than or equal to luminance IN (n−1) represented by the video signal of the previous frame, the amount of current to be supplied to the pixel does not exceed the amount of current supplied to the previous frame. Accordingly, even when the pixel is caused to emit light having luminance IN (n) corresponding to the video signal of the current frame, no abrupt increase occurs in the amount of current to be supplied to the pixel as described above. For this reason, signal processor 24 outputs the video signal of the current frame as it is.

In addition, when luminance IN (n) represented by the video signal of the current frame is equal to or smaller than predetermined threshold value TH, a current to be supplied to the pixel is reduced to the predetermined value or below. In other words, the current to be supplied to the pixel can be reduced by appropriately setting threshold value TH. Accordingly, in this case, signal processor 24 outputs the video signal of the current frame as it is. It is to be noted that threshold value TH can be set to be, for example, approximately 50% of the maximum luminance represented by the video signal.

It is to be noted that in the case where luminance IN (n) represented by the video signal of the current frame is smaller than or equal to luminance IN (n−1) of the previous frame even when luminance IN (n) is larger than threshold value TH, current can be reduced by current limiting circuit 40, and thus the video signal does not need to be processed by signal processor 24.

In the opposite case where luminance IN (n) represented by the video signal of the current frame is larger than luminance IN (n−1) represented by the video signal of the previous frame when luminance IN (n) is larger than threshold value TH, a current to be supplied to the pixel may exceed the current corresponding to the control target electric power value, signal processor 24 outputs a weighted average of the video signal of the current frame and the video signal of the previous frame.

Here, a description is given of the weighted average of the video signal of the current frame and the video signal of the previous frame. When the weight of luminance IN (n) represented by the video signal of the current frame is a (0<a<1), and the weight of luminance IN (n−1) represented by the video signal of the previous frame is (1−a), the weighted average is represented using Expression (1).

$$a \times IN(n) + (1-a) \times IN(n-1) \quad (1)$$

It is to be noted that, in this embodiment, weight a is a constant larger than 0 and smaller than 1. A peak current value which appears in a transient response becomes smaller and transient response time becomes longer, as weight a is decreased. In addition, the peak current value which appears in a transient response becomes larger and transient response time becomes shorter, as weight a is increased. Because of the trade-off, the value of a is determined according to the optimum balance between the peak current allowable for a product and the response time.

In this way, by taking the weighted average of luminance IN (n−1) smaller than luminance IN (n) and luminance IN (n), the luminance of the video signal to be output can be reduced below luminance IN (n). Accordingly, a current to be supplied to the pixel can be reduced.

When the video signals are R, G, and B signals, it is possible to use, as luminance IN (n) represented by the video signals, a sum W (n) obtained by multiplying the display data of respective R, G, and B sub-pixels by corresponding ones of weighting coefficients p, q, and r according to electric power consumption characteristics of the R, G, or B sub-pixels. In this case, when the display data of the respective R, G, and B signals is represented as R (n), G (n), and B (n), sum W (n) is represented according to Expression (2) below.

$$W(n) = p \times R(n) + q \times G(n) + r \times B(n) \quad (2)$$

In addition, when the video signals are RGB signals, the weighted averaging may be performed on each of the R, G, and B signals.

In addition, for example, when the video signal to be input to processing circuit 20 is a chrominance signal, luminance Y included in the chrominance signal can be used as luminance IN (n).

As described above, processing circuit 20 according to this embodiment is capable of reducing a current to be supplied to display panel 60 even when luminance IN (n) represented by a video signal abruptly increases. It is to be noted that a configuration is also conceivable in which processing circuit 20 always outputs a weighted average of luminance IN (n) and luminance IN (n−1) irrespective of the value of luminance IN (n). However, this configuration decreases responsibility to changes of video signals. In this embodiment, however, when luminance IN (n) represented by a video signal does not increase or smaller than or equal to predetermined threshold value TH, processing circuit 20 outputs the video signal as it is, and thus it is possible to reduce decrease in response performance to the video signals.

4. Effects and Advantages

Next, effects and advantages of display device 10 according to this embodiment are described in comparison with a display device in a comparative example. Here, a display device obtained by removing processing circuit 20 from display device 10 according to this embodiment is used as the display device in the comparative example.

Figure 11:
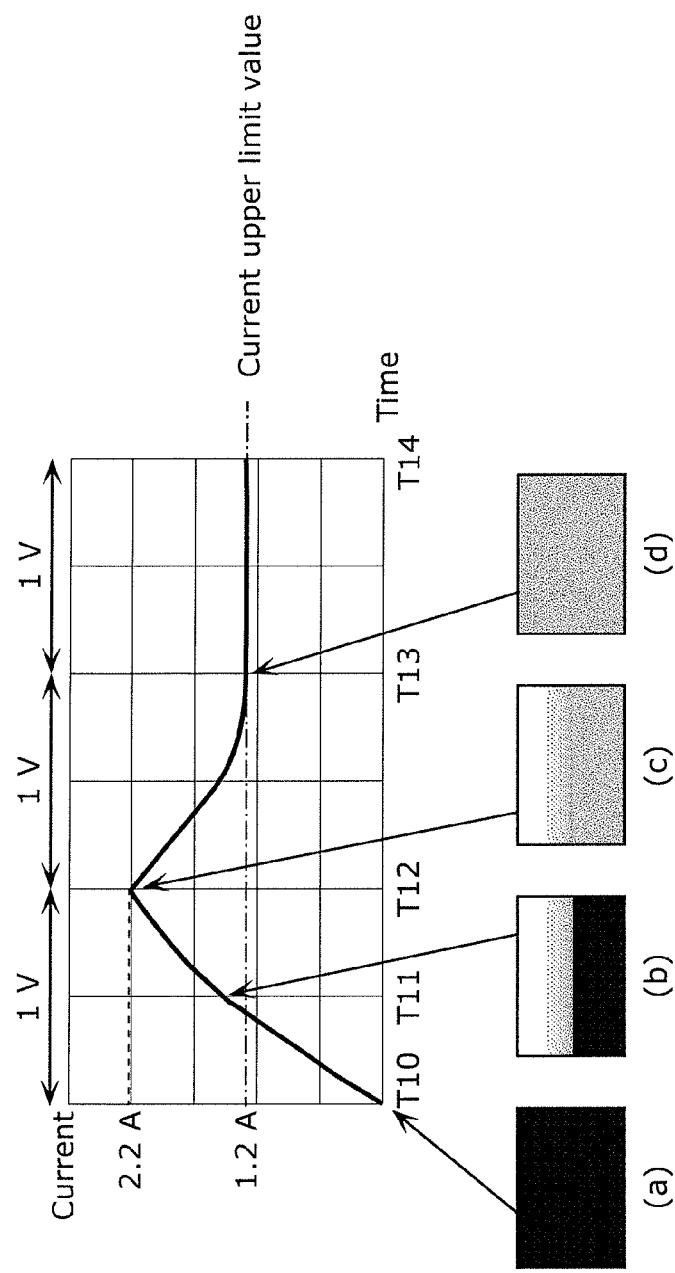
FIG. 11 is a graph indicating a temporal waveform of a current to be supplied to a plurality of pixels when switching from all black display to all white display is made in a display device in a comparative example.

First, in the display device in the comparative example, a current to be supplied to the plurality of pixels of display unit 70 is described with reference to FIG. 11. FIG. 11 is a graph representing a temporal waveform of a current to be supplied to the plurality of pixels when change from all black display to all white display is made in the display device in the comparative example. In the example illustrated in FIG. 11, all white display is maintained after all black display of display unit 70 is changed to all white display. FIG. 11 also illustrates images (a) to (d) displayed on display unit 70 at respective time points.

As illustrated in image (a) of FIG. 11, the display device in the comparative example is in an all black display state at time point T10 indicated at the left end of the graph in FIG. 11. In this case, almost zero current is to be supplied to the plurality of pixels in display unit 70. Next, when a video signal representing all white display is input to the display device in the comparative example, switching from black display to white display is made starting with the top-end line of display unit 70 for each horizontal period of display unit 70.

When switching from black display to white display is made from the top-end line of display unit 70, switching to white display is made according to the video signal in the lines positioned near the top-end line. However, the value of a current which is being supplied to the plurality of pixels exceeds a current upper limit value while switching to white display is being made. Here, the current upper limit value is a current value corresponding to a control target electric power value for the value of an electric power to be supplied to the plurality of pixels. In the example illustrated in FIG. 11, the current upper limit value is 1.2 A. When the value of the current to be supplied to the plurality of pixels exceeds the current upper limit value, current limiting circuit 40 multiplies the video signal by a gain less than 1 as described above.

In this way, the current to be supplied to the plurality of pixels is limited.

For example, at time point T11 after the elapse of ½ of a vertical period (1 V) from time point T10 in FIG. 11, the lines disposed at the upper half area of display unit 70 are switched from black display to white display. In this state, as illustrated in image (b) in FIG. 11, the luminance of the video signal is reduced by current limiting circuit 40, and thus the luminance of white display decreases from the top-end line toward lower lines. Specifically, although the top-end line of display unit 70 represents white display according to the video signal, the line disposed at the bottom among the lines which represent white display in image (b) in FIG. 11 (that is, the lines positioned at the middle in the vertical direction of display unit 70) represents white display (that is, gray display) with a luminance lower than the luminance represented by the video signal. Subsequently, the pixels disposed at the lower half area of display unit 70 also represent white display with a luminance lower than the luminance represented by the video signal. In this way, at time point T12 after one vertical period from time point T10, as illustrated in image (c) in FIG. 11, display unit 70 represents all white display in which luminance decreases toward the bottom end of display unit 70. At time point T12, in the lines near the top end of display unit 70 represent white display with a luminance as represented by the video signal, and thus the amount of current to be supplied to the entirety of the plurality of pixels exceeds the current upper limit value. In the example illustrated in FIG. 11, the amount of current to be supplied to the entirety of the plurality of pixels is approximately 2.2 A at the maximum.

The current to be supplied to the plurality of pixels is limited by current limiting circuit 40 also in the one vertical period from time point T12.

In this way, at time point T13 after the elapse of one vertical period from time point T12, all lines represent all white display at a luminance lower than the luminance represented by the video signal.

In this way, the value of current to be supplied to the plurality of pixels at and after time point T13 is limited to the current upper limit value or below.

As described above, in the display device according to the comparative example, the amount of current to be supplied to the plurality of pixels may dramatically exceed the current upper limit value temporarily.

Figure 12:
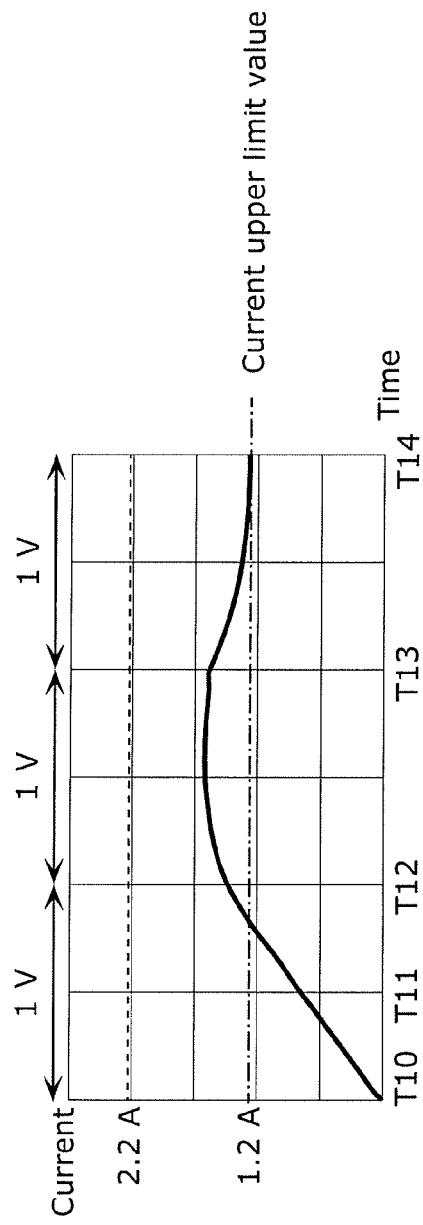
FIG. 12 is a graph indicating a temporal waveform of a current to be supplied to a plurality of pixels when switching from all black display to all white display is made in the display device according to the embodiment.

Next, in display device 10 according to this embodiment, a current to be supplied to the plurality of pixels of display unit 70 is described with reference to FIG. 12. FIG. 12 is a graph representing a temporal waveform of a current to be supplied to the plurality of pixels when change from all black display to all white display is made in display device 10 according to this embodiment.

As described above, processing circuit 20 of display device 10 outputs a video signal of a current frame as it is in the case where luminance IN (n) represented by the video signal which is of the current frame and corresponds to the pixel is smaller than or equal to luminance IN (n−1) represented by a video signal which is of a previous frame and corresponds to the pixel or is smaller than or equal to predetermined threshold value TH. In the other cases including the case where luminance IN (n) represented by the video signal of the current frame is larger than luminance IN (n−1) represented by the video signal of the previous frame and larger than predetermined threshold value TH, processing circuit 20 outputs a weighted average of the video signal of the current frame and the video signal of the previous frame.

As in the case illustrated in FIG. 12, when the video signal changes from all black display to all white display, luminance IN (n) represented by the video signal of the current frame is larger than luminance IN (n−1) represented by the video signal of the previous frame and is larger than predetermined threshold value TH. For this reason, processing circuit 20 outputs, to display panel 60 and current limiting circuit 40, a weighted average of the video signal representing all white display of a current frame and the video signal representing all black display of a previous frame, that is, a video signal representing white display with a luminance reduced from the luminance of the video signal of the current frame. For this reason, the value of a current to be supplied to the plurality of pixels during the period from time point T10 to time point T12 can be reduced more significantly than the display device in the comparative example as illustrated in FIG. 12.

In addition, in the example illustrated in FIG. 12, the video signal corresponding to the vertical period from time point T12 to time point T13 also represents all white display. Here, also the video signal of the previous frame stored in frame memory 22 of processing circuit 20 (that is, the video signal corresponding to the vertical period from time point T10 to time point T12 in FIG. 12) is a video signal representing all white display. In other words, luminance IN (n) represented by the video signal of the current frame is smaller than or equal to luminance IN (n−1) represented by the video signal of the previous frame, processing circuit 20 outputs the video signal to display panel 60 and current limiting circuit 40 as it is. Since the luminance represented by the video signal input to current limiting circuit 40 is larger than the luminance of the weighted-averaged video signal of the previous frame, the value of a current to be supplied to the plurality of pixels increases even in the period from time point T12 to time point T13. However, the maximum value of the current to be supplied to the plurality of pixels is reduced significantly relative to the maximum value of current in the comparative example.

Next, in the example illustrated in FIG. 12, the video signal corresponding to the vertical period from time point T13 to time point T14 also keeps representing all white display. Since this video signal is input to processing circuit 20, processing circuit 20 outputs the video signal representing all white display as it is as in the period from time point T12 to time point T13. The current to be supplied to the plurality of pixels is limited by current limiting circuit 40 to which the video signal representing all white display is input. In this way, the value of a current to be supplied to the plurality of pixels at and after time point T14 is limited to the current upper limit value or below.

As described above, display device 10 according to this embodiment is capable of reducing current to be supplied to the plurality of pixels of the display panel also when the luminance represented by a video signal abruptly increases.

5. Variation

Figure 13:
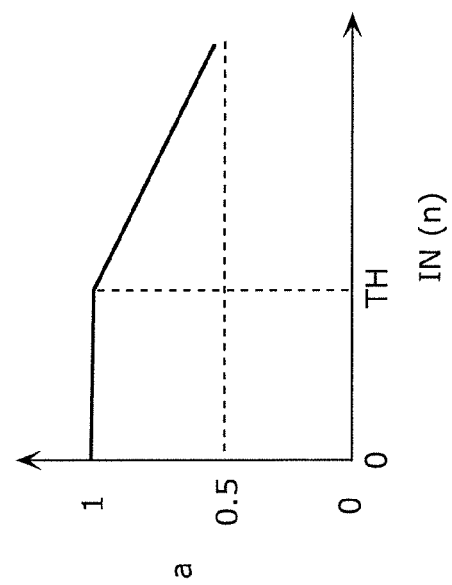
FIG. 13 is a graph indicating the relationship between weight a and luminance IN (n) according to a variation of the embodiment.

A variation of processing circuit 20 according to this embodiment is described. In processing circuit 20 according to this embodiment, although weight a to be used in weighted averaging is a constant in order to simplify processing in processing circuit 20, weight a does not always need to be a constant. In this variation, weight a is a function of luminance IN (n). Hereinafter, such weight a is described with reference to FIG. 13. FIG. 13 is a graph representing the relationship between weight a and luminance IN (n) according to this variation.

In the example illustrated in FIG. 13, weight a is 1 when luminance IN (n) is smaller than or equal to threshold value TH. In other words, the processing circuit outputs the video signal to be input, as it is. When luminance IN (n) is larger than threshold value TH, weight a decreases with increase in luminance IN (n). In this way, by designing weight a as a function of luminance IN (n), the processing circuit is capable of outputting a weighted average suitable for luminance IN (n). For example, although the amount of current to be supplied to a plurality of pixels increases with increase in luminance IN (n), the processing circuit according to this variation is capable of reducing the value of weight a by which the video signal of a current frame is to be multiplied with increase in luminance IN (n), thereby further reducing the amount of current.

It is to be noted that weight a may be a linear function of luminance IN (n), or a non-linear function. In addition, the minimum value of weight a may be, for example, 0.5 or above. In this way, it is possible to reduce drastic deterioration in response performance of the display device in response to a video signal.

Other Embodiments

Although the processing circuit, etc., according to the present disclosure have been described above based on the embodiment, the processing circuit, etc., according to the present disclosure are not limited to the above embodiment. The present disclosure encompasses other embodiments that are implemented by combining some of the optional constituent elements in the embodiments, variations that a person skilled in the art may arrive at by adding various kinds of modifications to the above embodiments within the scope of the present disclosure, or various kinds of apparatuses which include the processing circuit according to any of the embodiments.

Figure 14:
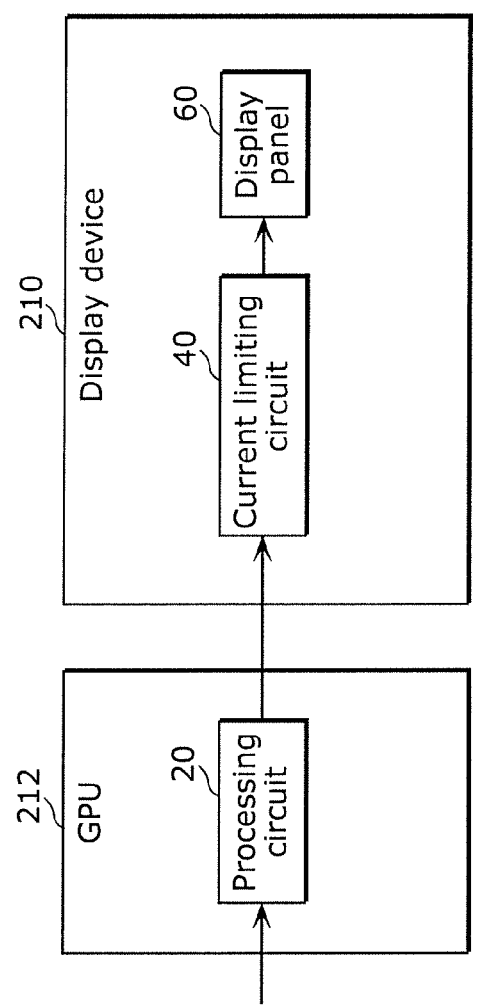
FIG. 14 is a block diagram illustrating a relationship between a processing circuit and a display device according to a variation.
Figure 15:
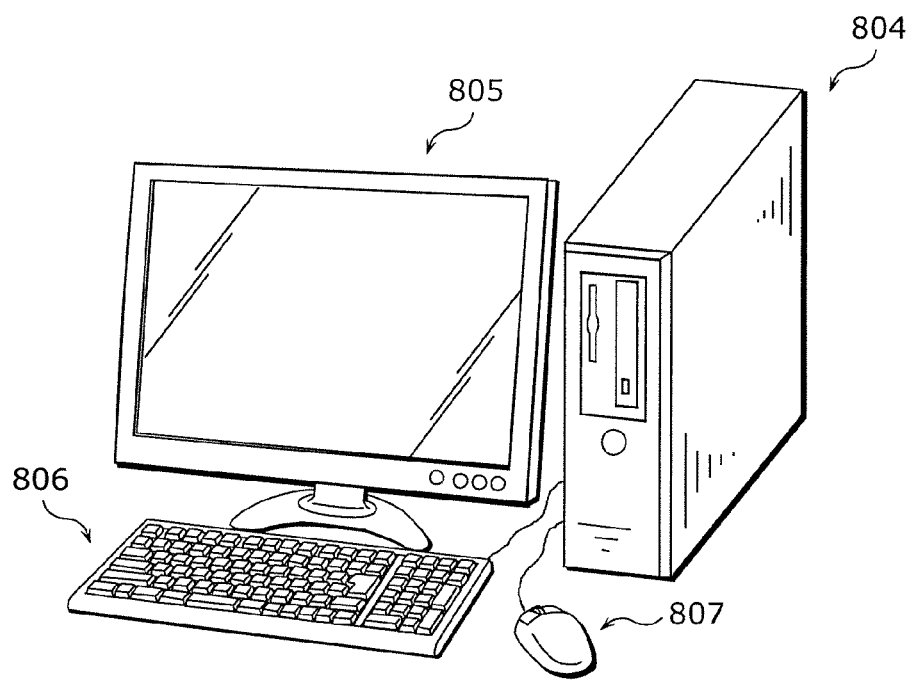
FIG. 15 is an appearance of a PC which includes the processing circuit according to the variation.
Figure 16:
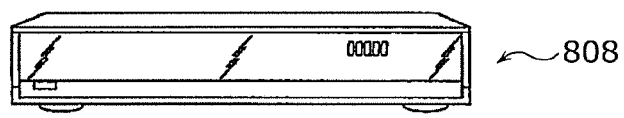
FIG. 16 is an appearance of a hard disc recorder which includes the processing circuit according to the variation.

For example, although processing circuit 20 is provided in the display device in the above embodiment, processing circuit 20 does not always need to be provided in the display device. Such a variation is described with reference to FIG. 14. FIG. 14 is a block diagram illustrating the relationship between processing circuit 20 and display device 210 according to this variation. As illustrated in FIG. 14, processing circuit 20 is included in graphics processing unit (GPU) 212. GPU 212 is a computation device for image processing, receives a video signal as an input, and outputs a video signal processed by processing circuit 20. GPU 212 is disposed outside display device 210, and outputs the video signal processed by processing circuit 20 to display device 210. GPU 212 may be included in a personal computer (PC) 804 as illustrated in FIG. 15. PC 804 is operated by keyboards 806, mouse 807, etc. Display device 210 may be included in monitor 805 illustrated in FIG. 15. Monitor 805 includes display device 210, and displays a video signal from PC 804. In addition, GPU 212 may be included in hard disc recorder 808 as illustrated in FIG. 16.

Even in the case where processing circuit 20 is not included in the display device as described above, the same advantages as provided by processing circuit 20 according to the embodiment are also provided.

Figure 17:
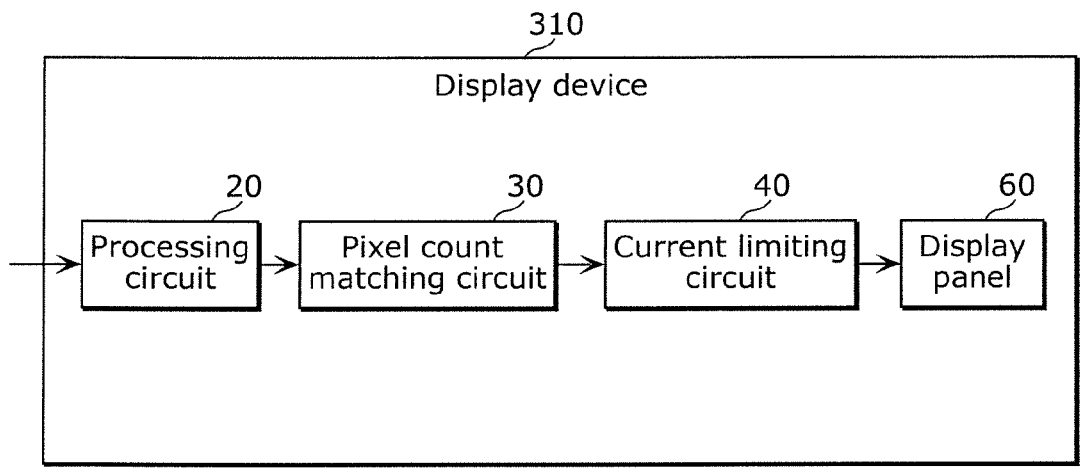
FIG. 17 is a functional block diagram representing a functional configuration of the display device according to the variation.

When the pixel count of display panel 60 according to the above embodiment and the pixel count of video signals to be input to processing circuit 20 are different from each other, a pixel count matching circuit of an enlargement circuit or a reduction circuit for mating the pixel count of the video signals to the pixel count of display panel 60 is inserted between processing circuit 20 and current limiting circuit 40. The display device according to such a variation is described with reference to FIG. 17. FIG. 17 is a functional block diagram indicating a functional configuration of display device 310 according to a variation. As illustrated in FIG. 17, display device 310 according to this variation includes processing circuit 20, current limiting circuit 40, and display panel 60, as in display device 10 according to the above embodiment. Display device 310 according to this variation further includes pixel count matching circuit 30.

Pixel count limiting circuit 30 is a circuit which receives video signals output from processing circuit 20, and outputs, to current limiting circuit 40, matching video signals obtained by matching the pixel count of the video signals to the pixel count of display panel 60. For example, in the case where the video signals to processing circuit 20 are high-definition (HD) signals (of 1920×1080 pixels), and the pixels of display panel 60 are 4 k pixels (3840×2160 pixels), an enlargement circuit which increases the pixel count of the video signals is used as pixel count matching circuit 30. In the opposite case where the video signals to processing circuit 20 are 4 k signals, and the pixels of display panel 60 are HD pixels, a reduction circuit which reduces the pixel count of the video signals is used as pixel count matching circuit 30.

As illustrated in FIG. 14, when processing circuit 20 is not included in the display device, pixel count matching circuit 30 may be included at GPU 212 side, or at display device 210 side.

In addition, pixel count matching circuit 30 may switch processing according to the pixel count of video signals to be input. In other words, pixel count matching circuit 30 may increase the pixel count of the video signals by the enlargement circuit when the pixel count of the video signals needs to be increased, reduce the pixel count of the video signals by the reduction circuit when the pixel count of the video signals needs to be reduced, and output the video signal as it is (without changing the pixel count of the video signals) when there is no need to change the pixel count of the video signals. Such process switching may be automatically performed based on the format of a video signal and pixel count information of display panel 60 which has been obtained in advance.

Figure 18:
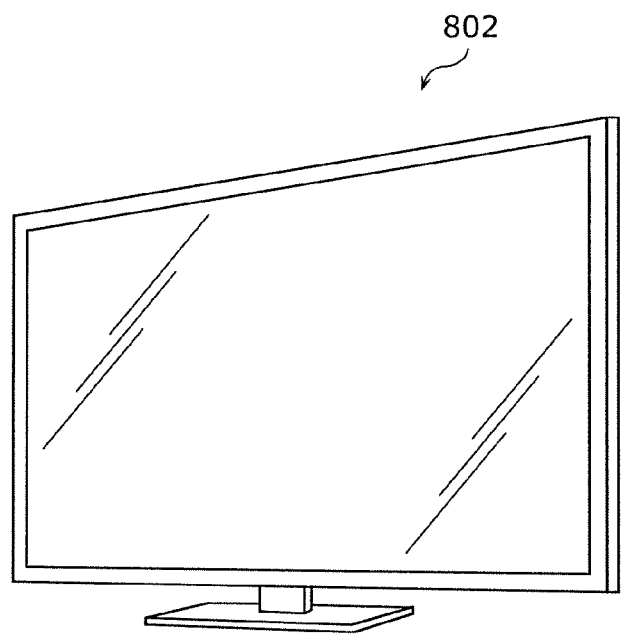
FIG. 18 is an appearance of a thin flat TV which includes the display device according to the embodiment.

In addition, the display device according to the embodiment may be embedded in thin flat TV 802 as illustrated in FIG. 18. Even in this case, advantages similar to those obtainable in the above embodiment are provided.

In addition, in the above embodiment, the configuration in which each of the pixels of the display panel includes three sub-pixels corresponding respectively to R, G, and B colours. However, the pixel configuration is not limited thereto. For example, each of the pixels may include four sub-pixels corresponding respectively to R, G, B, and W colours. In addition, when the pixel panel is a monochrome display panel, the pixels may include a single circuit as illustrated in FIG. 5.

In addition, in the above embodiment, the video signals are RGB signals, the video signals may include signals other than the RGB signals. In other words, it is only necessary that video signals include RGB signals.

In addition, video signals are not limited to signals including RGB signals. For example, video signals may be chrominance signals including luminance signals. In this case, luminance Y included in a chrominance signal can be used as luminance IN (n).

In addition, although organic EL elements are used as self light emitting elements in the above embodiment, self light emitting elements are not limited thereto. For example, inorganic EL elements or the like may be used as self light emitting elements.

INDUSTRIAL APPLICABILITY

The present disclosure is useful for organic EL flat panel displays, and is particularly suitable for use in displays with a large display screen which consume large electric power.

The invention claimed is:

1. A processing circuit which processes video signals for a display device which includes a display panel and a current limiting circuit, the display panel including a plurality of pixels each having a self light emitting element, the current limiting circuit limiting a current to be supplied to the plurality of pixels, the processing circuit comprising:
   a frame memory which stores video signals of a previous frame which is a frame before a current frame to be input to the processing circuit, the video signals corresponding to the plurality of pixels; and
   a signal processor which:
   compares a luminance represented by a video signal which is included in video signals of the current frame and which corresponds to a pixel included in the plurality of pixels and a luminance represented by a video signal which is included in the video signals of the previous frame and which corresponds to the pixel;
   outputs the video signal of the current frame as is in a case where the luminance represented by the video signal of the current frame is equal to or smaller than the luminance represented by the video signal of the previous frame or equal to or smaller than a predetermined threshold value; and
   outputs a weighted average of the video signal of the current frame and the video signal of the previous frame in any other case.

2. The processing circuit according to claim 1, wherein the video signals include RGB signals.

3. The processing circuit according to claim 1, wherein the video signals include luminance signals.

4. The processing circuit according to claim 1, wherein weights for the weighted average are constants.

5. The processing circuit according to claim 1, wherein weights for the weighted average are functions of luminances represented by the video signals.

6. The processing circuit according to claim 1, wherein the weighted average is represented using the following expression:

$$a \times IN(n) + (1-a) \times IN(n-1) \qquad (1)$$

where a weight of luminance IN (n) represented by the video signal of the current frame is a (0<a<1), and a weight of luminance IN (n−1) represented by the video signal of the previous frame is (1−a).

7. A display device, comprising:
   the processing circuit according to claim 1;
   the display panel; and
   the current limiting circuit.

8. The display device according to claim 7, further comprising:
   a pixel count matching circuit which receives the video signals output from the processing circuit, and outputs matching video signals obtained by matching a pixel count of the video signals to a pixel count of the display panel.

9. A processing method for processing video signals for a display device which includes a display panel and a current limiting circuit, the display panel including a plurality of pixels each having a self light emitting element, the current limiting circuit limiting a current to be supplied to the plurality of pixels, the processing method comprising:

storing video signals of a previous frame which is a frame before a current frame, the video signals corresponding to the plurality of pixels;

comparing a luminance represented by a video signal which is included in video signals of the current frame and which corresponds to a pixel included in the plurality of pixels and a luminance represented by a video signal which is included in the video signals of the previous frame and which corresponds to the pixel;

outputting the video signal of the current frame as is in a case where the luminance represented by the video signal of the current frame is equal to or smaller than the luminance represented by the video signal of the previous frame or equal to or smaller than a predetermined threshold value; and outputting a weighted average of the video signal of the current frame and the video signal of the previous frame in any other case.

* * * * *